UNITED STATES PATENT OFFICE.

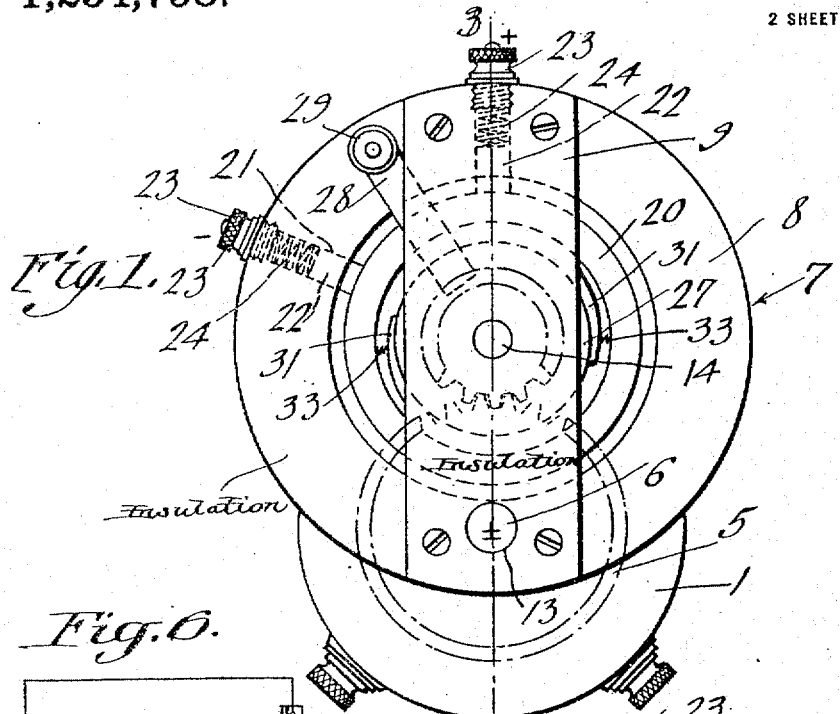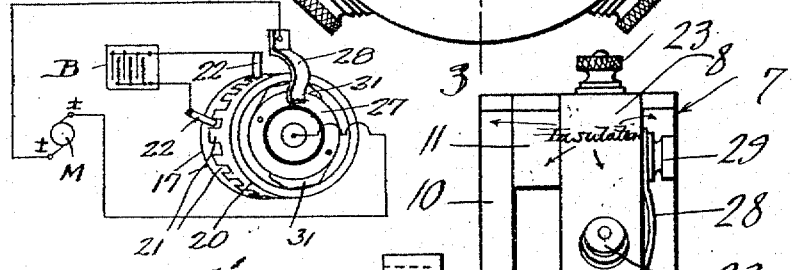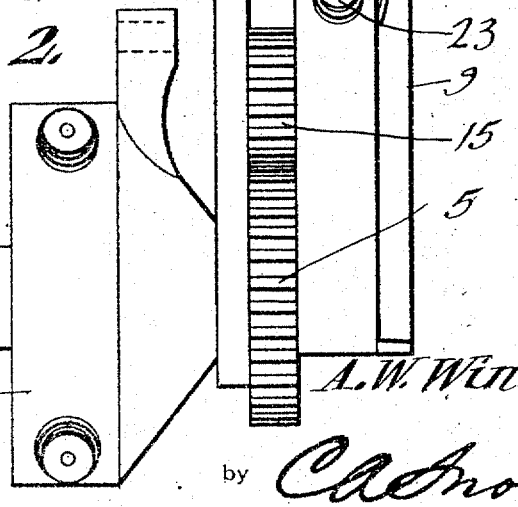

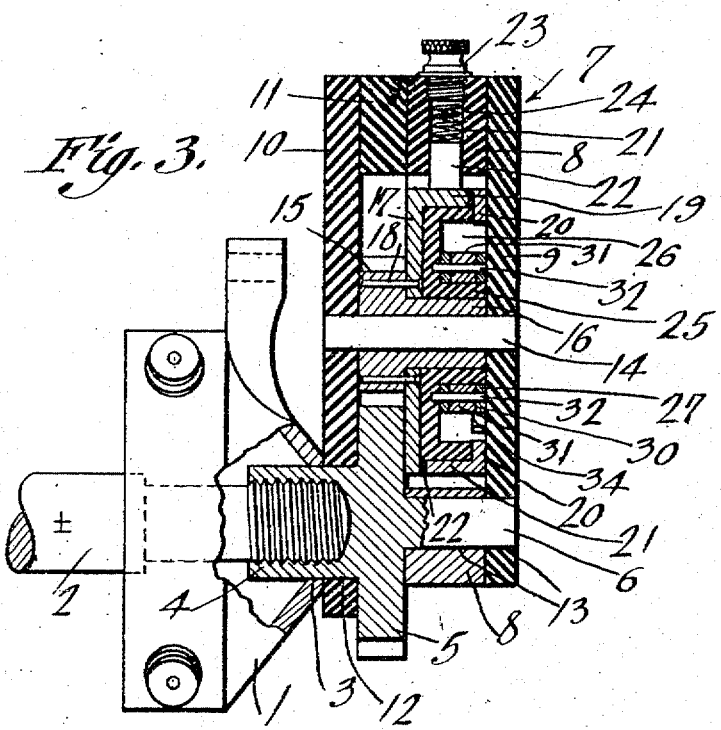
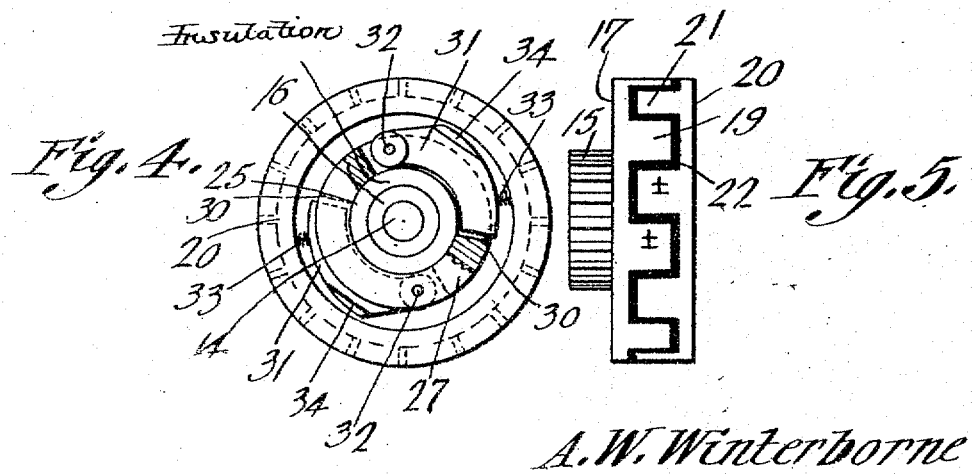

ARTHUR WILLIAM WINTERBORNE, OF SAN ANTONIO, TEXAS.

MECHANICAL RECTIFIER.

1,254,758.  Specification of Letters Patent.  Patented Jan. 29, 1918.

Application filed June 24, 1916. Serial No. 105,678.

*To all whom it may concern:*

Be it known that I, ARTHUR W. WINTERBORNE, a citizen of the United States, residing at San Antonio, in the county of Bexar and State of Texas, have invented a new and useful Mechanical Rectifier, of which the following is a specification.

The present invention appertains to rectifiers for converting alternating current into direct current, and aims to provide a novel and improved mechanical rectifier adapted especially for use upon Ford automobiles for connection with the magneto or generator whereby the alternating current will be converted into direct current for charging a storage battery during the operation of the engine, whereby current can be supplied by the storage battery for lighting the lamps when the engine is idle as well as when the machine is in operation, it being understood, however, that the present device can be used for various purposes.

It is the object of the invention to provide a rectifier of simple, compact and inexpensive construction, which can be readily installed, and which will serve its office in a thoroughly practical and efficacious manner.

Another object of the invention is the provision of a rectifier of the nature indicated having a novel circuit breaker for breaking the circuit when the speed of the engine is decreased below a predetermined amount, thereby disconnecting the magneto and storage battery.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:

Figure 1 is a front view of the rectifier.

Fig. 2 is a side elevation thereof.

Fig. 3 is a median section of the device taken on the line 3—3 of Fig. 1. portions being shown in elevation.

Fig. 4 is a front view illustrating the circuit breaker, portions being shown in section.

Fig. 5 is a side elevation of the device illustrated in Fig. 4, showing the rectifier rings.

Fig. 6 is a diagrammatical view of the rectifier connected with the magneto and storage battery.

In the drawings, there is illustrated the cover 1 of the timer of a Ford automobile, and 2 designates the cam shaft which in the present instance is employed as the driving shaft of the rectifier. The cover 1 is provided with an opening 3 for the reception of the socketed hub 4 of a spur gear 5 which hub is threaded upon or otherwise engaged to the shaft 2. The gear 5 has a central outstanding pintle 6.

There is provided a frame 7 for the rectifier which is constructed of fiber or other insulating material, and it embodies a ring 8, a front strip 9 extending diametrically across the ring 8, a rear strip 10 extending diametrically across the rear face of the ring, and a block 11 between one end of the strip 10 and the ring 8, said parts being bolted or otherwise secured together, and the frame 7 is attached to the frame or other part of the automobile, to prevent the displacement or rotation of the frame 7, whereby said frame is normally held in proper position.

The gear 5 is disposed between the strip 10 and ring 8 remote from the block 11, and its hub 4 extends through an opening 12 in the strip 10, while the pintle 6 projects into an aperture 13 of the strip 9 and ring 8.

An axle or arbor 14 is terminally engaged within the strips 9 and 10 between their ends and centrally of the ring 8, and has mounted for rotation thereon a spur gear 15 meshing with the gear 5, the hub 16 of the gear 15 being elongated and mounted loosely upon the axle 14 with its ends abutting the strips 9 and 10. The hub 16 extends forwardly from the gear 15 which is located adjacent to the rear strip 10, and the hub 16 carries the rectifying means.

The rectifying means embodies a disk or flat ring 17 mounted upon the hub 16 and bearing against the gear 15, and secured by means of rivets 18 or otherwise to said gear. This rectifier ring 17 is grounded by way of the gears 15 and 5 to the shaft 2 to which one terminal of the magneto is grounded. The periphery or margin of the ring 17 is provided with forwardly projecting segments 19. A second rectifier ring 20 is disposed in front of the ring 17 and is provided with rearwardly projecting segments 21 projecting between the segments 19, whereby the segments of the two rectifier rings alternate. The segments 19 and 21 are insulated from one another and from the opposite rings by the insulation 22, whereby the rectifier ring 20 is insulated from the shaft 2.

The ring 8 of the frame is provided with radial bores 21 arranged at the proper angle relative to one another, whereby when a segment of one rectifier ring registers with one bore 21, a segment of the other ring registers with the other bore. Carbon or other suitable brushes 22 are slidable within the inner ends of the bores 21 to contact with the segments, and screw plugs 23 are threaded into the outer ends of the bores 21 and also serve as binding posts for the connection of the conductors leading to the opposite poles of the storage battery B. Coiled wire expansion springs 24 are disposed within the bores 21 between the brushes 22 and plugs 23 for pressing the brushes into engagement with the segments. The segments of the two rings engage alternately with the brushes.

Fitted against the ring or disk 17 and between the hub 16 and segments is a ring 25 of insulating material, provided with an annular recess 26, whereby said ring is of U-shaped section, as seen in Fig. 3, the back of said ring contacting with the disk or ring 17. A metallic ring 27 is fitted upon the central or hub portion of the insulating ring 25, and a leaf spring brush 28 has its free terminal contacting continuously with the face of the ring 27, said brush 28 being carried by a binding post 29 attached to the ring 8. This binding post 29 and brush 28 are connected to the one terminal of the magneto M, whose other terminal is grounded by way of the shaft 2 and gears 5 and 15 to the ring 17.

A centrifugal circuit breaker is used for electrically connecting and disconnecting the ring 27 and rectifier ring 20. Thus, the ring 27 is provided with arcuate slots 30 accommodating arcuate centrifugal arms 31 pivoted at certain ends upon pins 32 engaged through the ring 27, whereby said arms 31 will swing outwardly by centrifugal force when the rectifier rings are rotated above a predetermined speed. The arms 31 are forced inwardly by means of coiled wire expansion springs 33 confined between the arms 31 and rim or outer portion of the insulating ring 25, said springs 33 being insulated from the rectifier ring 20. The arms 31 are provided between their ends with outstanding contacts 34 to contact with the inner edge of the ring 20 when the arms are thrown outwardly by centrifugal force.

In operation, the rectifier rings 19—20, insulating ring 25, and ring 27 rotate as a unit with the gear 15 which is in turn rotated by the shaft 2, and the rectifier rings are rotated at the proper speed to keep in step with the magneto, whereby the rectifier rings are advanced one step for each change in the flow of the alternating current. When the engine is running slowly below a predetermined rate of speed, the centrifugal action will not be sufficient to swing the arms 31 outwardly against the tension of the springs 33, and the ring 27 will therefore be disconnected from the rectifier ring 20, to break or open the charging circuit, as will be apparent. However, when the speed of the engine is increased sufficiently, the centrifugal arms 31 will fly outwardly and contact with the ring 20, thus bringing the rectifier automatically into operation so that the storage battery will be charged by the magneto. During one wave of the alternating current, one brush 22 contacts with a segment 19 of the rectifier ring 17 and the other brush 22 contacts with a segment 21 of the insulating rectifier ring 20, and when the magneto has turned to produce an opposite wave of the alternating current, the rectifier rings will have advanced one step whereby the first mentioned brush now engages a segment 21, while the second brush engages a segment 19. Thus, as the rectifier rings are alternately charged with positive and negative current, said rectifier rings rotate whereby the positively charged segments engage one brush 22 only while the negatively charged segments engage the other brush only, thus providing for a continuous flow of direct current between the binding posts or plugs 23. Thus, by connecting the storage battery to the plugs or binding posts 23, the storage battery is charged by the magneto. The present rectifier thus enables the storage battery to be charged by the magneto, whereby current can be had when the engine is idle, as well as when the engine is running, for lighting the lamps of the machine, and the storage battery current can be used for other purposes also.

By letting the brush 28 contact with the rectifier ring 20, the circuit breaker is cut out, and the brushes 22 will be charged at any speed of rotation of the rectifier rings.

Having thus described the invention, what is claimed as new is:

1. A mechanical rectifier comprising a frame embodying a ring and strips at opposite sides thereof, a gear mounted for rotation between said strips centrally of the ring, rectifier rings rotatable with said gear within the first mentioned ring and having alternately arranged segments, brushes carried by the first mentioned ring engageable with said segments, and a second gear meshing with the first mentioned gear and disposed between one strip and the first mentioned ring, the second mentioned gear having a portion extending through said strip for attachment with a driving element.

2. A mechanical rectifier comprising a frame embodying a ring and front and rear strips extending across the faces thereof, an axle engaged with said strips centrally of the ring, a gear having a hub rotatable upon the axle and projecting forwardly from said gear, said gear being arranged adjacent the rear strip, a second gear meshing with the aforesaid gear and disposed between the rear strip and ring, the second gear having a pintle extending within said ring and a socketed hub extending through the rear strip for attachment to a driving shaft, a pair of rectifier rings carried by the hub of the first mentioned gear within the frame ring and having alternately arranged segments, and brushes carried by the frame ring and engageable with said segments.

3. A rectifier embodying a rotatable member, a rectifier ring mounted thereon and having segments projecting therefrom, a second rectifier ring rotatable with said member and having segments projecting between and insulated from the aforesaid segments, brushes engageable with said segments, an insulating ring disposed between said rotatable member and segments, said insulating ring having an annular recess, a metallic ring carried by the insulating ring within said recess and second mentioned rectifier ring, a brush engageable with the metallic ring, and a centrifugal circuit breaker for connecting and disconnecting the metallic ring and second mentioned rectifier ring.

4. A rectifier embodying a frame, an axle carried thereby, a gear mounted upon the axle and having a hub projecting therefrom, a flat rectifier ring mounted upon said hub and secured to said gear, said ring having segments projecting from its marginal portion, a second rectifier ring having segments projecting between and insulated from the aforesaid segments, brushes carried by the frame engageable with said segments, an insulating ring of U-shaped section fitting between said hub and segments and having its back resting against the first mentioned rectifier ring, a metallic ring fitted upon the central portion of the insulating ring and having arcuate slots, and arcuate centrifugal arms pivoted to the last mentioned ring in said slots and swingable outwardly by centrifugal action, said arms having contacts to engage the second mentioned rectifier ring.

In testimony that I claim the foregoing as my own, I have hereto affixed my signature in the presence of two witnesses.

ARTHUR WILLIAM WINTERBORNE.

Witnesses:
W. H. WINTERBORNE,
L. K. LAURSEN.